US011953165B2

(12) United States Patent
Li et al.

(10) Patent No.: US 11,953,165 B2
(45) Date of Patent: Apr. 9, 2024

(54) CONNECTION SYSTEM FOR A LUMINAIRE, AND A LIGHTING SYSTEM USING THE CONNECTION SYSTEM

(71) Applicant: SIGNIFY HOLDING B.V., Eindhoven (NL)

(72) Inventors: Xuelin Li, Shanghai (CN); Xia Wang, Shanghai (CN); Jisong Xu, Shanghai (NL); Chienliang Yeh, Yilan (TW)

(73) Assignee: SIGNIFY HOLDING, B.V., Eindhoven (NL)

( * ) Notice: Subject to any disclaimer, the term of this patent is extended or adjusted under 35 U.S.C. 154(b) by 57 days.

(21) Appl. No.: 17/773,094

(22) PCT Filed: Oct. 27, 2020

(86) PCT No.: PCT/EP2020/080114
§ 371 (c)(1),
(2) Date: Apr. 29, 2022

(87) PCT Pub. No.: WO2021/089365
PCT Pub. Date: May 14, 2021

(65) Prior Publication Data

US 2022/0373146 A1 Nov. 24, 2022

(30) Foreign Application Priority Data

Nov. 4, 2019 (WO) ................ PCT/CN2019/115326

(51) Int. Cl.
*F21S 4/28* (2016.01)

(52) U.S. Cl.
CPC ....................................... *F21S 4/28* (2016.01)

(58) Field of Classification Search
CPC ........................................................ F21S 4/28
See application file for complete search history.

(56) References Cited

U.S. PATENT DOCUMENTS

| | | | | |
|---|---|---|---|---|
| 5,658,066 | A | 8/1997 | Hirsch | |
| 6,659,628 | B2 | 12/2003 | Gomez Del Campo | |
| 6,851,831 | B2 | 2/2005 | Karlicek, Jr. | |
| 8,313,212 | B1 | 11/2012 | Mayer et al. | |
| 8,894,437 | B2 | 11/2014 | Adams et al. | |
| 9,470,375 | B2 | 10/2016 | Van Es | |
| 2008/0297072 | A1* | 12/2008 | Snijder | F21V 21/005 315/312 |
| 2011/0013400 | A1* | 1/2011 | Kanno | H05K 1/142 439/78 |

(Continued)

FOREIGN PATENT DOCUMENTS

| | | | |
|---|---|---|---|
| CN | 204163310 | U | 2/2015 |
| CN | 205782218 | U | 12/2016 |

(Continued)

*Primary Examiner* — Leah Simone Macchiarolo

(57) ABSTRACT

A connection system is provided for modular luminaires, wherein the luminaires are each provided with at least one tapered pillar projecting from a back, the pillar having a top opening. A coupling arrangement is used for coupling the two luminaires together, in the form of a bridge having first and second tapered openings for fitting over the pillars. A sprung retaining clip projects within each opening for passing through the top opening and thereby gripping the pillar.

14 Claims, 7 Drawing Sheets

(56) References Cited

U.S. PATENT DOCUMENTS

| | | | | |
|---|---|---|---|---|
| 2012/0020088 | A1* | 1/2012 | Tamai | F21S 4/28 362/249.02 |
| 2013/0295799 | A1* | 11/2013 | Ishii | H01R 11/01 439/884 |
| 2018/0187868 | A1 | 7/2018 | Dankelmann et al. | |

FOREIGN PATENT DOCUMENTS

| | | | |
|---|---|---|---|
| CN | 205938616 | U | 2/2017 |
| CN | 108413273 | A | 8/2018 |
| DE | 202015100867 | U1 | 3/2015 |
| EP | 0870981 | A1 | 10/1998 |
| JP | 2005243599 | A | 9/2005 |
| KR | 100967946 | B1 | 7/2010 |
| KR | 20170119523 | A | 10/2017 |
| WO | 2012101547 | A1 | 8/2012 |
| WO | 2014184699 | A1 | 11/2014 |
| WO | 2015191283 | A1 | 12/2015 |
| WO | 2018053172 | A1 | 3/2018 |

* cited by examiner

SECTION A-A

SECTION B-B

SECTION C-C

CONNECTION SYSTEM FOR A LUMINAIRE, AND A LIGHTING SYSTEM USING THE CONNECTION SYSTEM

CROSS-REFERENCE TO PRIOR APPLICATIONS

This application is the U.S. National Phase application under 35 U.S.C. § 371 of International Application No. PCT/EP2020/080114, filed on Oct. 27, 2020, which claims the benefit of Chinese Patent Application No. PCT/CN2019/115326, filed on Nov. 4, 2019. These applications are hereby incorporated by reference herein.

FIELD OF THE INVENTION

This invention relates to luminaires formed as a set of interconnected housings.

BACKGROUND OF THE INVENTION

It is known to form a lighting system as a set of connected modular housings. Each individual housing may be considered to form part of a separate luminaire, and together they define an overall lighting system. The housings are for example coupled together to form a line.

The connected housings may for example be suspended from a ceiling or else the side walls and bases of the housings may be recessed into a ceiling.

It is desirable to be able to install the housings together in a perfectly straight line. Typically, mounting brackets and additional pins are used in the lighting system to hold the housings together, one by one. For example, some connecting parts may be mounted inside or outside the two luminaires to connect the two housings, i.e. connect the luminaires, together. The longer the coupling parts, the better the control of how straight the two housings can be made after being installed.

A problem which arises for a connected set of housings is that it may be difficult and complicated to remove one luminaire that needs to be replaced or repaired from the overall system.

Furthermore, it may be difficult to obtain or keep a tight fit between two housings. They may need to be held together with their vertical end surfaces face-to-face while the making the connection.

It would be desirable to have a housing design, which simplifies connecting and disconnecting, and makes a tight fitting between adjacent housings easier to achieve.

SUMMARY OF THE INVENTION

The invention is defined by the claims.

According to examples in accordance with an aspect of the invention, there is provided a connection system for modular luminaires, each luminaire comprising:

- a housing having an open front and a back, at least one end of the housing comprising:
  - an end face;
  - a tapered pillar projecting from the back, the tapered pillar having a top opening,
- wherein the connection system comprises a coupling arrangement for coupling respective ends of the housings of two luminaires together butted against each other, the coupling arrangement comprising:

- a bridge having a first and second tapered openings, each for fitting over a respective tapered pillar of one of the two adjacent housing ends; and
- a sprung retaining clip projecting within the opening, for passing though the top opening of the respective tapered pillar and for gripping the pillar beneath the top opening.

This connection system provides a simple push fit connection, with a connecting bridge pushed over a pair of pillars, to align those pillars both in the height direction and the length and width directions (the length direction corresponding to the end-end direction of the housing). The use of a sprung clip avoids the need for additional connecting parts as the bridge clips into place by means of the sprung clips.

Each pillar may have a rectangular shape and all sides of the rectangular shape taper. The tapered shape makes easy initial positioning of the bridge over the pillars, and as the bridge is pushed down, the housings are brought into accurate alignment when the sprung clip engages with the pillar.

The top opening of each pillar for example comprises an elongate slot, with its long axis parallel to the end face.

Each sprung retaining clip for example comprises a limb having a shaft and a barb at the end of the shaft, wherein a width of the shaft is parallel to the long axis of the elongate slot. Thus, a wide sprung retaining clip fits in a wide slot. A strong coupling is thereby provided.

The barb of the limb may comprise a cam lower surface for engaging with the slot during attachment of the coupling arrangement and a retaining upper surface for engaging with the underside of the slot after attachment of the coupling arrangement. The cam surface is used to push the sprung retaining clip against its spring bias, and it then snaps back with the upper surface preventing removal of the bridge.

The retaining upper surface may be for engaging with the underside of a top surface of the pillar in which the top opening is formed. This reduces the number of parts. The pillar may simply be a hollow projection and the sprung retaining clip engages with the underside of the slot.

The sprung retaining clip is for example adapted to deform away from the end face during attachment of the coupling arrangement and spring back after attachment of the coupling arrangement. The spring force thus pulls the two adjacent housings together.

A top of the bridge for example comprises a top wall with openings enabling access to the sprung retaining clips. This enables the two housings to be separated by inserting a tool, such as a blade of a screwdriver, into the openings, to push the sprung clips against their bias and release the bridge from the pillars.

The coupling arrangement is preferably a push fit over two tapered pillars without external fixings. This provides a simple assembly with no tools.

The invention also provides a luminaire comprising:

- a housing having an open front and a back, at least one end of the housing comprising:
  - an end face; and
  - a tapered pillar projecting from the back, the tapered pillar having a top opening,
- wherein the dimensions of the tapered pillar and the top opening are arranged to enable connection of the housings of two luminaires together using the connection system as defined above.

The tapered pillar is for example positioned in the middle, in the housing width direction, of the back of the housing The end of the housing may comprise a plurality of pillars projecting from the back, across the width of the housing.

This provides a more secure connection across the width of the housing. Multiple bridges may be used to connect the two housings.

The end of the housing may further comprise a respective pillar projecting from the back at each side of the housing. In this way, a coupling may be provided between the end of one housing and a side (around the corner from the end) of another housing, thus forming a right-angled connection between two housings.

The luminaire may further comprise one or more of:

- a light transmissive cover for covering an opening of the housing;
- one or more lighting units within each housing; and
- a lighting driver mounted outside the housing.

The invention also provides a linear lighting system comprising:

- a set of at least two luminaires, each as defined above; and
- a connection system as defined above for coupling respective ends of the housings of adjacent luminaires.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
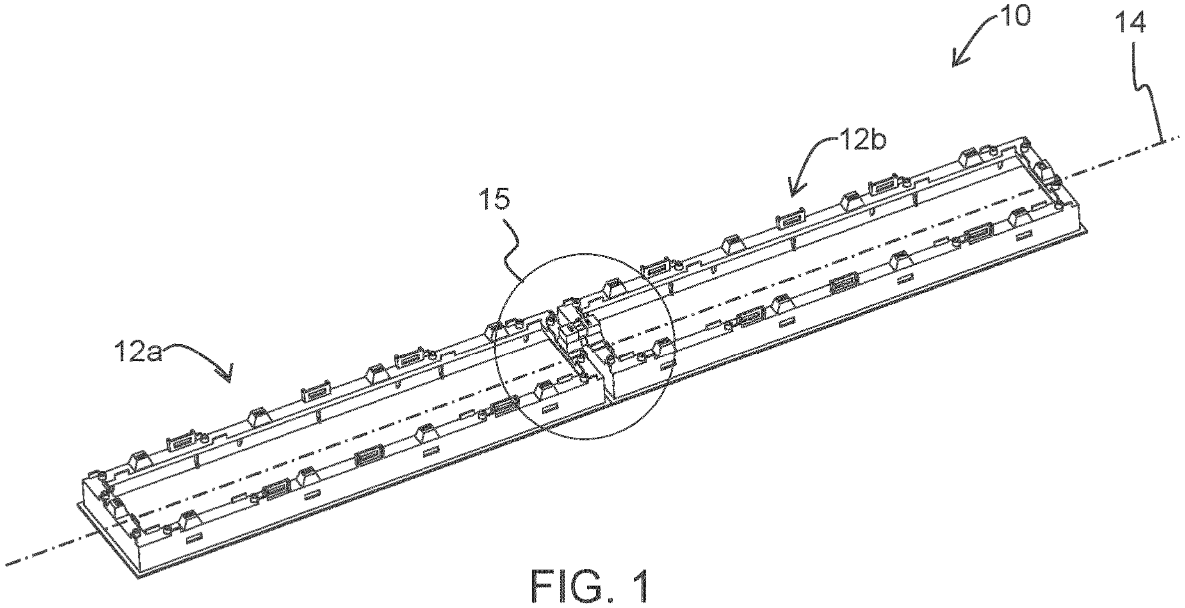
FIG. 1 shows a modular lighting system.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features and advantages of systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a connection system for modular luminaires, wherein the luminaires are each provided with at least one tapered pillar projecting from a back, the pillar having a top opening. A coupling arrangement is used for coupling the two luminaires together, in the form of a bridge having first and second tapered openings for fitting over the pillars. A sprung retaining clip projects within each opening for passing through the top opening and thereby gripping the pillar. The invention provides a connection system which avoids the need for tools and allows a push fit connection.

FIG. 1 shows a modular lighting system 10 having modular set of luminaires which may be arranged in a line. Each luminaire comprises a housing, in this example formed as a frame having sides and ends. A housing axis 14 extends between the ends. A set of two luminaires, and hence two housings 12*a*, 12*b*, is shown. There are at least first and second luminaires, and hence at least first and second housings 12*a*, 12*b* to be connected together. They are connection together at a connection area 15.

The housings are shown as elongate so that the axis 14 is the elongate axis. However, the housings do not need to be elongate. They may for example be square (i.e., rectangular with aspect ratio of 1) or have an aspect ratio of 2 or 4.

Each housing 12*a*, 12*b* has an open front which forms the light output side of the luminaire and a back. The backs are visible in FIG. 5.

Figure 2:
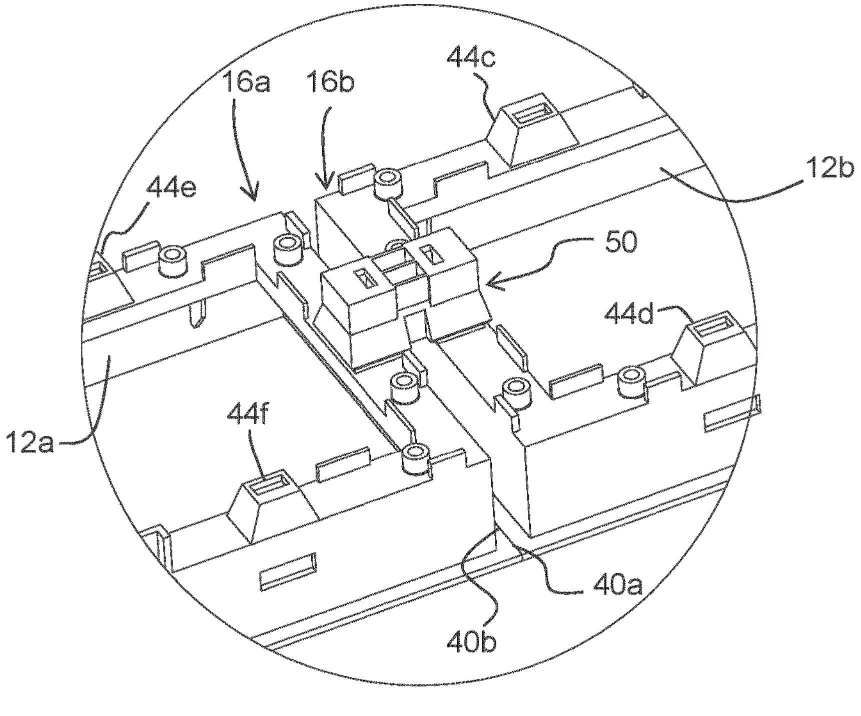
FIG. 2 shows the connection area more clearly.

FIG. 2 shows the connection area (15 in FIG. 1) more clearly. It shows one end 16*a* of a first housing 12*a* and one end 16*b* of a second housing 12*b*. The ends of the housings comprise an end face 40*a*, 40*b* and a tapered pillar projecting from the back. Projecting pillars 44*c*, 44*d*, 44*e* and 44*f* are seen, but there are two tapered pillars which are covered by a coupling arrangement 50. They are shown in FIG. 3.

The tapered pillars have a rectangular shape. In one example, all sides of the rectangular shape taper.

The connection system comprises a coupling arrangement 50 for coupling respective ends of the housings of two luminaires together butted against each other. The coupling arrangement 50 is in the form of a bridge having tapered openings which fit over the pillars.

Figure 3:
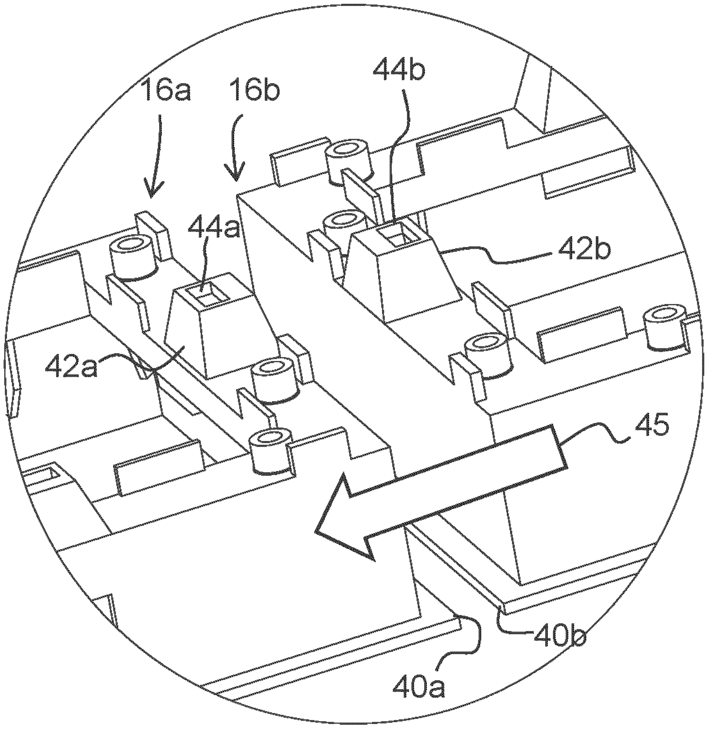
FIG. 3 shows the connection area before introduction of the coupling arrangement.

FIG. 3 shows the connection area before introduction of the coupling arrangement. It shows the tapered pillars 42*a*, 42*b* which are to be coupled by the coupling arrangement 50, projecting from the back. Each tapered pillar has a top opening 44*a*, 44*b*.

The connection system pulls the two pillars together, aligning them in the length and width directions, as well as aligning them in the height direction. The connection shown in FIGS. 2 and 3 forms a line of housings. However, a right-angled connection may also be formed.

This is the purpose of the additional pillars 44*c*, 44*d*, 44*e*, 44*f* shown in FIG. 2. The housings in this way each further comprise a respective pillar projecting from the back at each side of the housing. The positioning of these additional pillars is such that the end face of one housing may be aligned with a side face of the connected housing, so that a continuous right angle is formed. Thus, the spacing of the pillars from the end corners is the same.

FIGS. 2 and 3 show a single pillar at each end (and a single pillar at each side). There may instead be a plurality of pillars across the width the housing, to enable connection to be made at multiple locations across the width the housing.

FIG. 3 shows an initial approximate alignment of the two housings. They are brought together as shown by arrow 45. The coupling arrangement 50 is then fitted over the top of an adjacent pair of the pillars.

Figure 4:
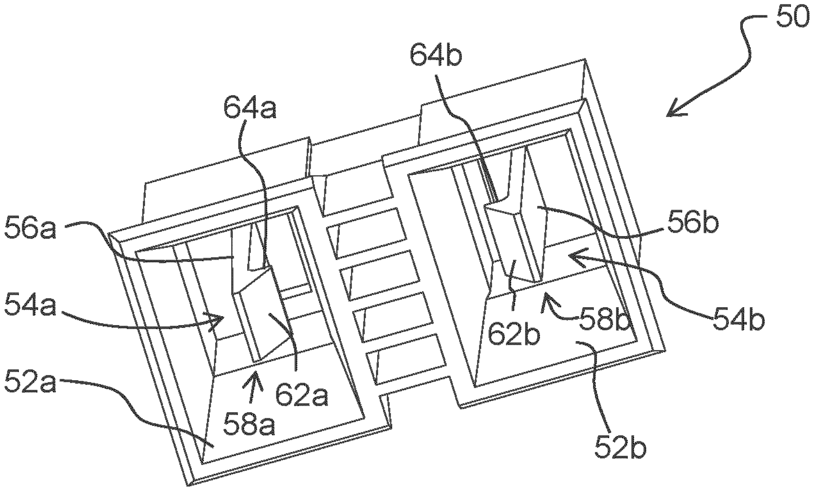
FIG. 4 shows the coupling arrangement in more detail, viewed from the underside.

FIG. 4 shows the coupling arrangement in more detail, viewed from the underside.

The coupling arrangement comprises a bridge having a first and second tapered opening 52*a*, 52*b*, each for fitting over a respective tapered pillar 42*a*, 42*b*.

The bridge has a top surface, and a sprung retaining clip 54*a*, 54*b* projects downwardly from the top surface within each opening 52*a*, 52*b*.

The sprung retaining clip 54*a*, 54*b* is for passing though the top opening 44*a*, 44*b* (FIG. 3) of the respective tapered pillar. It then grips the pillar beneath the top opening. The bridge is a push fit connection over the pillars. The engagement of the tapered pillars with the tapered openings aligns the pillars in the height direction, the length direction (the length direction corresponding to the housing axis direction) and the width direction.

Each sprung retaining clip 54*a*, 54*b* comprises a limb having a shaft 56*a*, 56*b* and a barb 58*a*, 58*b* at the end of the shaft. A width of the shaft 56*a*, 56*b* is parallel to the long axis of the slot 44*a*, 44*b* in the top of the pillar. Thus, a wide sprung retaining clip fits in a wide slot.

The shaft may have a width in the range of 10% to 50% of the width of the housing. A wider shaft and slot may improve the alignment but may give a large coupling arrangement and more difficult initial alignment. The shaft width and slot length may for example be in the range 5 mm to 2 cm.

The four side walls of the pillars may slope with the same angle, such as between 0 and 25 degrees. However, different faces may have different slopes. There could be 1 to 3 of the side walls arranged to be vertical or with a slight draft angle, for injection molding purposes.

The barb 58*a*, 58*b* of each limb comprises a cam (or slant) lower surface 62*a*, 62*b* for engaging with the slot during attachment of the coupling arrangement. The cam engagement pushes the sprung retaining clips outwardly (i.e. away from the ends of the housings), and they snap back inwardly after the connection has been made.

The barbs also have a retaining upper surface 64*a*, 64*b* for engaging with the underside of the slot 44*a*, 44*b* after attachment of the coupling arrangement 50. The upper surfaces 64*a*, 64*b* prevent removal of the bridge after it has been snapped into place.

Figure 5:
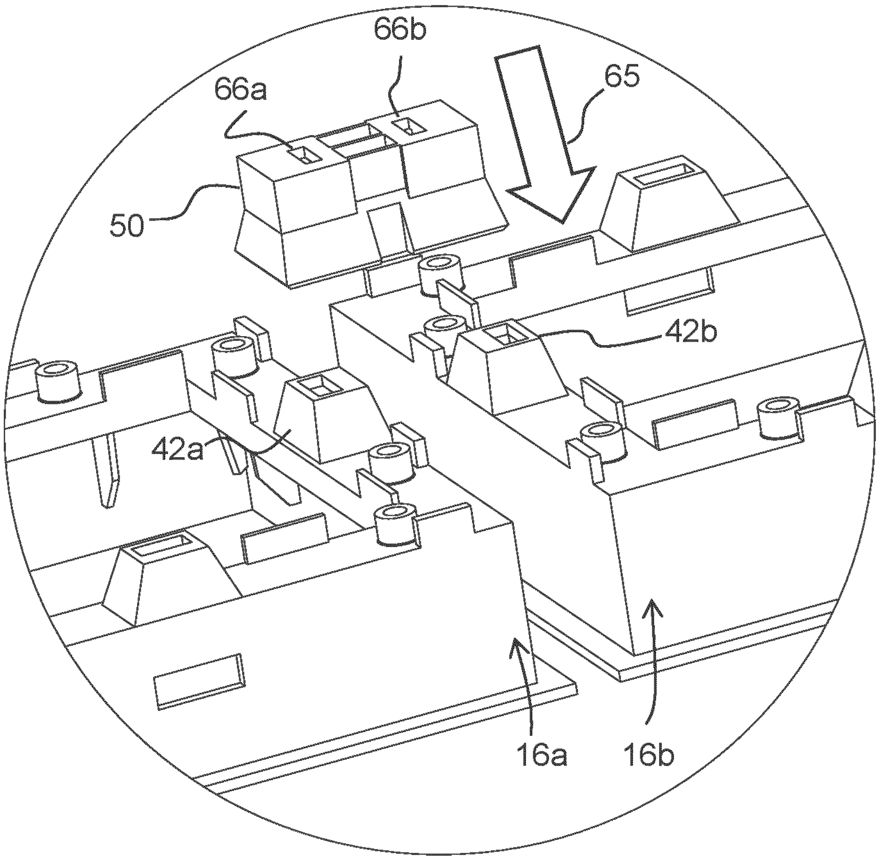
FIG. 5 shows the application of the coupling arrangement after the initial alignment of the housings.

FIG. 5 shows the application of the coupling arrangement 50 after the initial alignment of the housings. The bridge is applied as shown by arrow 65.

FIG. 5 also shows that the top wall of the bridge has openings 66*a*, 66*b* enabling access to the sprung retaining clips 54*a*, 54*b*. In particular, the two housings can be separated by inserting a tool such as a screwdriver into the openings 66*a*, 66*b*, to push the sprung clips against their bias and release the bridge from the pillars.

FIGS. 6 to 11 are used to show cross sectional views.

Figure 6:
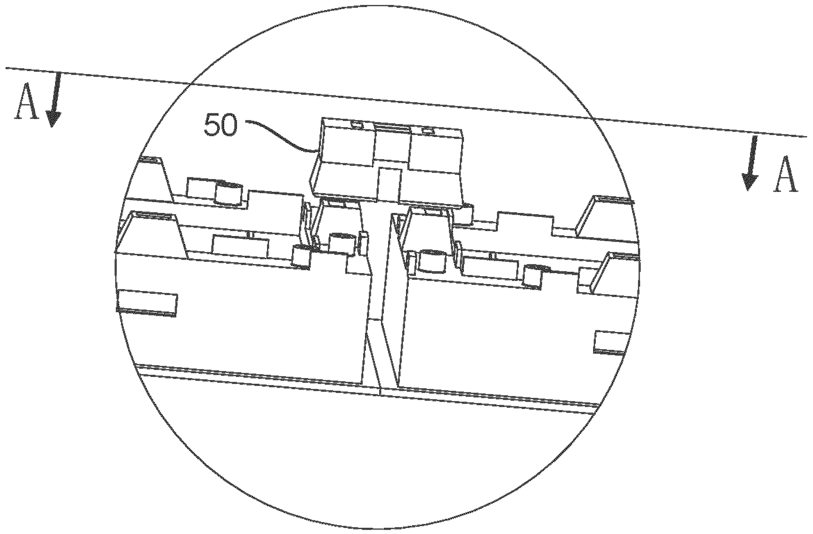
FIG. 6 defines a cross sectional line A-A along a housing axis direction, with the housings butted together.

FIG. 6 defines a cross sectional line A-A along the housing axis direction, with the housings butted together, but the coupling arrangement 50 not yet attached.

Figure 7:
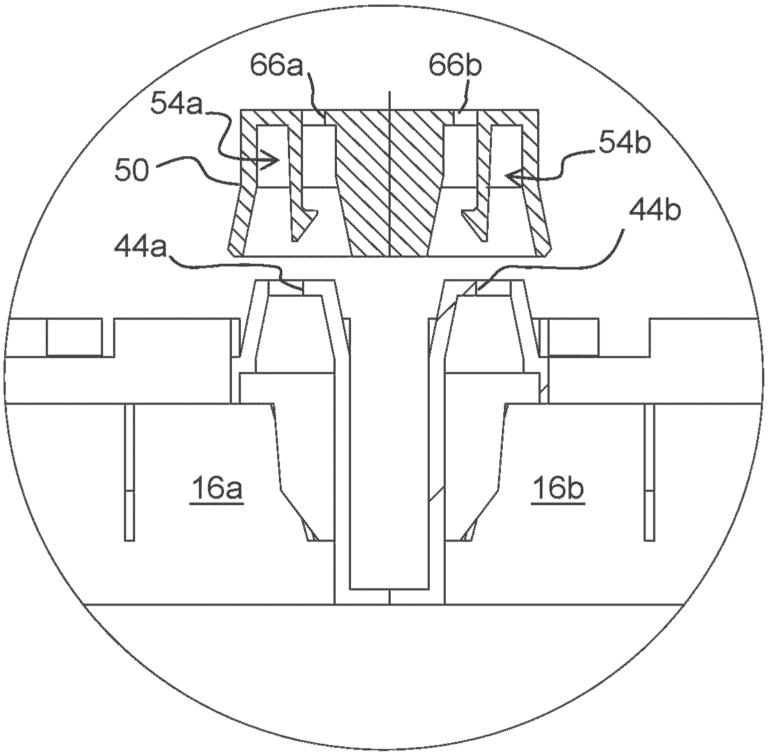
FIG. 7 shows the cross section A-A of FIG. 6.

FIG. 7 shows the cross section along line A-A. It can be seen that the sprung clips 54*a*, 54*b* need to deform outwardly before they can pass through the top openings 44*a*, 44*b*.

Figure 8:
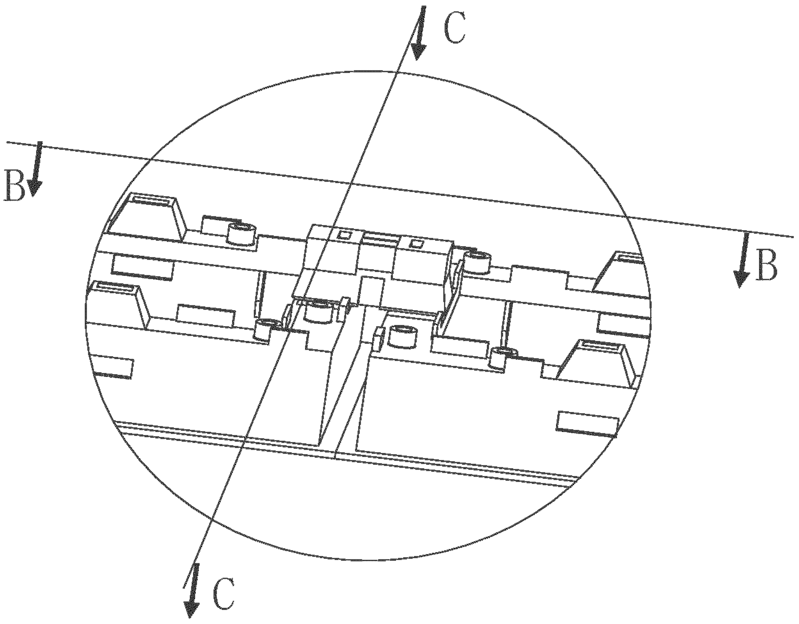
FIG. 8 defines a cross sectional line B-B along the housing axis direction and a cross sectional line C-C across the width direction.

FIG. 8 defines a cross sectional line B-B along the housing axis direction and a cross sectional line C-C across the width direction, with the coupling arrangement clipped in place.

Figure 9:
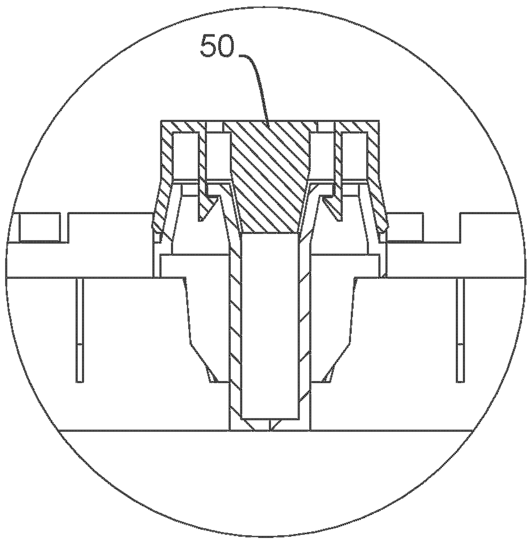
FIG. 9 shows the cross section along line B-B of FIG. 8.

FIG. 9 shows the cross section along line B-B. It can be seen that the barbs of the sprung clips (in particular the retaining upper surfaces) engage with the underside of a top surface of the pillar in which the top opening 44*a*, 44*b* is formed. The pillar is simply a hollow projection and the sprung retaining clip engages with the underside of the slot in the top surface.

Figure 10:
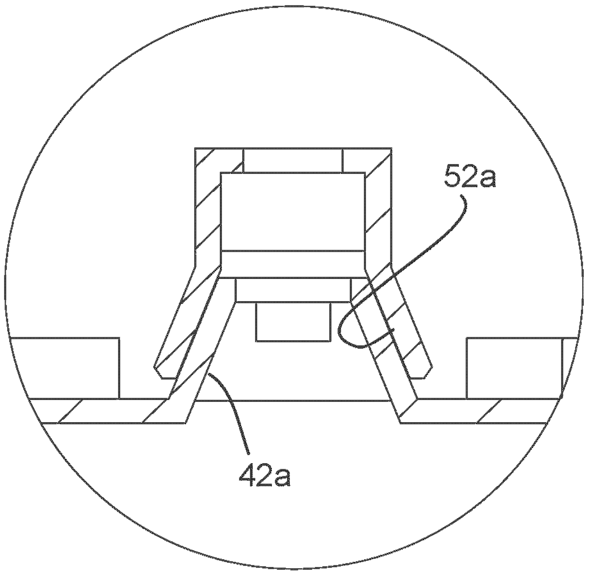
FIG. 10 shows the cross section along line C-C of FIG. 8.

FIG. 10 shows the cross section along line C-C. It can be seen how the tapered faces of the pillar 42*a* and tapered opening 52*a* engage to align the two parts.

Figure 11:
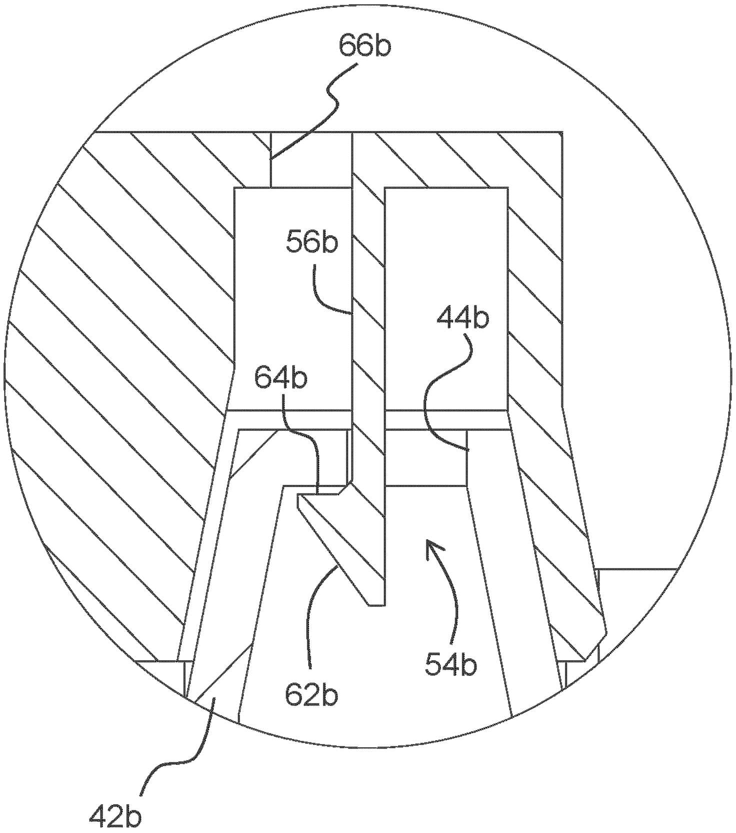
FIG. 11 shows the engagement of the one sprung clip with one pillar more clearly.

FIG. 11 shows the engagement of the sprung clip 54*b* with the pillar 42*b* even more clearly.

Only the luminaire housing has been shown in the figures above. The light source and drive arrangement of a luminaire will be mounted in each luminaire housing. Typically, each luminaire comprises a light transmissive cover for covering an opening of the housing, one or more lighting units within each housing; and a lighting driver mounted outside the housing.

Figure 12:
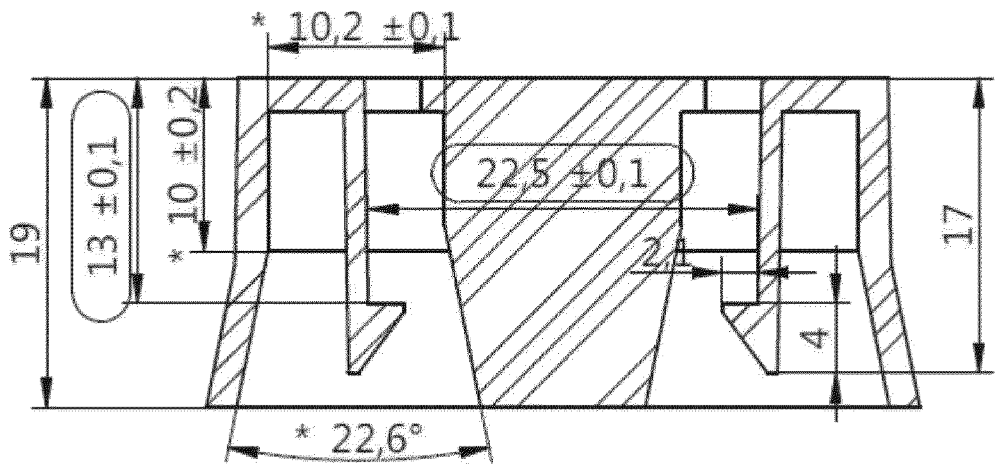
FIG. 12 shows the coupling arrangement in cross section to show typical dimensions.
Figure 13:
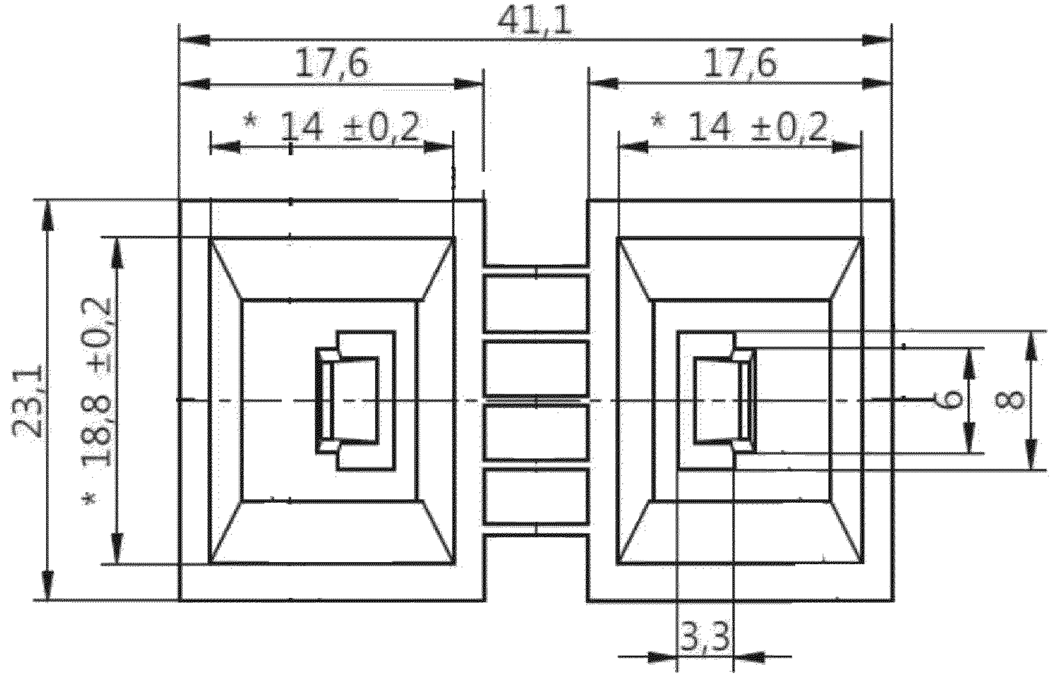
FIG. 13 shows the coupling arrangement from below, to show typical dimensions.

By way of example, FIG. 12 shows the coupling arrangement 50 in cross section and FIG. 13 shows the coupling arrangement 50 from below, to show typical dimensions. The coupling arrangement is shown with a length 41.1 mm (for example more generally in the range 20 mm to 60 mm) and a width 23.1 mm (for example more generally in the range 10 mm to 50 mm). The angle of taper of each of the two sides of the tapered opening in a plane parallel to the housing axis direction is 11.3 degrees. In the transverse plane, the taper angle is for example larger, such as 21.8 degrees. Generally, the angle of taper is less than 25 degrees. In this example, the four sides of the tapered opening do not all have the same taper angle (there are two values of taper angle), as can been seen from the view from beneath. The shaft has a width of 6 mm (generally between 5 mm and 20 mm) and a length of 13 mm (generally between 10 mm and 20 mm). The coupling arrangement has an overall height in this example of 19 mm (generally between 10 mm and 30 mm).

For the example of linear luminaires, the width of the housings is for example in the range 50 mm to 600 mm and the length may be in the range 50 cm to 150 cm. However, as mentioned above, the connection system may be applied to any shape of luminaire. For example, suitable housing dimensions are 132 mm×526 mm and 132 mm×264 mm.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A linear lighting system comprising:

a set of at least two luminaires and a connection system coupling respective ends of housings of adjacent luminaires;

wherein each luminaire comprising:

a housing having an open front and a back, at least one end of the housing comprising:

an end face;

a tapered pillar projecting from the back, the tapered pillar having a top opening, wherein the connection system comprises a coupling arrangement for coupling respective ends of the housings of two luminaires together butted against each other, the coupling arrangement comprising:

a bridge having a first and second tapered openings, each for fitting over a respective tapered pillar of one of the two adjacent housing ends; and a sprung retaining clip projecting within each of the first and second tapered opening, for passing though the top opening of the respective tapered pillar and for gripping the pillar beneath the top opening.

2. A linear lighting system as claimed in claim 1, wherein each pillar has a rectangular shape and all sides of the rectangular shape taper.

3. A linear lighting system as claimed in claim 1, wherein the top opening of each pillar comprises an elongate slot, with its long axis parallel to the end face.

4. A linear lighting system as claimed in claim 3, wherein each sprung retaining clip comprises a limb having a shaft and a barb at the end of the shaft, wherein a width of the shaft is parallel to the long axis of the elongate slot.

5. A linear lighting system as claimed in claim 4, wherein the barb of the limb comprises a cam lower surface for engaging with the slot during attachment of the coupling arrangement and a retaining upper surface for engaging with the underside of the slot after attachment of the coupling arrangement.

6. A linear lighting system as claimed in claim 5, wherein the retaining upper surface is for engaging with the underside of a top surface of the pillar in which the top opening is formed.

7. A linear lighting system as claimed in claim 1, wherein the sprung retaining clip is adapted to deform away from the end face during attachment of the coupling arrangement and spring back after attachment of the coupling arrangement.

8. A linear lighting system as claimed in claim 1, wherein a top of the bridge comprises a top wall with openings enabling access to the sprung retaining clips.

9. A linear lighting system as claimed in claim 1, wherein the coupling arrangement is a push fit over two tapered pillars without external fixings.

10. A linear lighting system as claimed in claim 1, wherein the dimensions of the tapered pillar and the top opening are arranged to enable connection of the housings of two luminaires together using the connection system.

11. A linear lighting system as claimed in claim 10, wherein the tapered pillar is positioned in the middle, in the housing width direction, of the back of the housing.

12. A linear lighting system as claimed in claim 10, wherein the end of the housing comprises a plurality of pillars projecting from the back, across the width of the housing.

13. A linear lighting system as claimed in claim 10, wherein the end of the housing further comprises a respective pillar projecting from the back at each side of the housing.

14. A linear lighting system as claimed in claim 10, further comprising one or more of:

a light transmissive cover for covering an opening of the housing;

one or more lighting units within each housing; and a lighting driver mounted outside the housing.

* * * * *